United States Patent [19]

Jeppsson

[11] Patent Number: 4,802,095

[45] Date of Patent: Jan. 31, 1989

[54] METHOD FOR INDICATING END MILL WEAR

[75] Inventor: Jan Jeppsson, Bellevue, Wash.

[73] Assignee: The Boeing Company, Seattle, Wash.

[21] Appl. No.: 946,423

[22] Filed: Dec. 24, 1986

[51] Int. Cl.$^4$ .............................................. G05B 19/48
[52] U.S. Cl. ........................ 364/474.17; 364/167.01;
364/474.02; 318/572; 73/104; 73/862.06
[58] Field of Search ....................... 364/170, 474, 475;
340/680; 73/104, 862.06; 318/572, 563, 565, 571

[56] References Cited

U.S. PATENT DOCUMENTS

| | | | |
|---|---|---|---|
| 2,498,881 | 2/1950 | Eldridge, Jr. | 73/862.06 |
| 3,728,595 | 4/1973 | Adams | 318/571 |
| 3,735,157 | 5/1973 | Whetham | 318/571 |
| 3,819,916 | 6/1974 | Watanabe | 364/474 |
| 3,849,712 | 11/1974 | Lankford | 364/474 |
| 4,444,061 | 4/1984 | Mathias | 73/104 |
| 4,559,600 | 12/1985 | Rao | 364/474 |
| 4,617,147 | 6/1987 | Komanduri et al. | 73/104 |

FOREIGN PATENT DOCUMENTS 0485330  9/1975  U.S.S.R. ......................... 734/862.06

OTHER PUBLICATIONS

"A Two Component Lathe Dynamoter," B. L. Ten Horn et al., Microtecnic, vol. XI., No. 2, pp. 59–66.

Primary Examiner—John R. Lastova
Attorney, Agent, or Firm—Bruce A. Kaser

[57] ABSTRACT

A system is provided for measuring tool wear of a rotating end mill. The system measures wear by monitoring the side-loading forces on the tool during cutting. The resultant side-loading forces FRES have tangential FT and radial FR components. The radial component FR increases correspondingly with tool wear. FRES and FT are measured directly and on the basis of these measurements FR is determined mathematically to provide an indication of tool wear.

4 Claims, 4 Drawing Sheets

METHOD FOR INDICATING END MILL WEAR

DESCRIPTION

1. Technical Field

The subject matter of this patent application relates generally to milling machines, and more particularly, to inventions which are concerned with the detection of wear of a milling machine's cutting tool.

This patent application is related to another application filed by the same inventor, such other application having a filing date of Jan. 31, 1986 and Ser. No. 825,134, now U.S. Pat. No. 4,698,773.

2. Background Art

A milling operation typically involves the use of a sharp-edged tool that cuts a workpiece or part in a desired manner. The cutting tool gradually becomes dull after a period of time and a tool that is too dull can undesirably affect the final dimensions and finish of the cut part, and can have other undesirable effects as well.

In the past, the most common method of detecting tool wear has been to rely on the subjective judgement of the milling machine operator. Generally, increases in tool noise and heat indicate tool wear. The operator can therefore use his senses to decide whether a tool is worn by monitoring these kinds of parameters. The usual response of an operator to higher than normal levels of noise and heat is to initially reduce the tool's feed rate, which thereby reduces loading forces on the tool as it cuts. It is also a usual response to stop machine operation for the purpose of inspecting both the tool and the finish of the part.

One problem associated with the above procedures is that they tend to make milling operations less efficient. Since the operator makes a somewhat subjective determination of tool wear based on his senses, and since the operator does not wish to cause damage to the part because of a worn tool, the operator tends to err on the conservative side when determining wear. What this usually means is that when the operator slows feed rate, he tends to slow it to a rate lower than necessary; or machine operation is stopped an unecessary amount of time for the purpose of inspecting the tool or part; or when a tool is replaced, it is done too early and before the tool is used to its fullest extent.

To avoid the above occurrences and to maximize tool life, in certain industries statistical data is developed on how long a particular tool can be used when cutting a particular part. In this situation, after the tool is used for a statistically predetermined period of time it is replaced without inspection and regardless of its actual wear condition. This is typical practice in the automotive industry, for example, where milling is often done in high volume and large lot sizes, and it is relatively easy to keep records of the accumulated time of tool use. Although this method is not particularly inefficient in this kind of production environment, it is difficult to apply in other industries where milled parts are made only in small lot sizes. There has been a long felt need therefore to develop systems that can accurately detect tool wear, and preferably, detect tool wear automatically thus eliminating reliance on a machine operator's judgment.

At least two different kinds of automatic tool wear monitoring systems are known to presently exist in the art. The first kind determines tool wear on the basis of a tool's acoustic and/or mechanical vibration characteristics during milling. The second kind determines tool wear by monitoring variations in the amount of horse power used to drive the tool.

Monitoring acoustic or mechanical vibration requires appropriate sensors, usually in the form of piezo-electric sensors suitably mounted to a milling machine in a manner to sense tool vibration. As the tool wears, the vibration power spectra generated by the sensors change and thus can be used to measure wear. A great amount of research effort has been expanded on developing wear indicating systems of this type. In addition, many patents have issued using this or similar approaches including: U.S. Pat. No. 3,548,648 issued to Weichbrodt et al.; U.S. Pat. No. 3,694,637 issued to Edwin et al.; U.S. Pat. No. 3,710,082 issued to Sloane et al.; and others.

The implementation of vibration monitoring systems in the working environment, however, has been slow, mostly because these systems require complex data processing capabilities. Further, these types of systems have reliability problems because it is known the response of vibration power spectra to tool wear is not consistent for different types of milling operations where different tools are used. It is known, for example, that spectra response varies as a function of (a) tool type, (b) material making up the part, (c) size and shape of the part, and (d) cutting fluid and other parameters. It is therefore difficult to develop automatic systems of this type which are commonly adaptible to a variety of different milling machines and/or milling conditions.

The drawbacks associated with the second kind of system mentioned above, i.e. one which senses tool wear on the basis of horsepower, were discussed at great length in the above-identified copending application Ser. No. 825,134. Briefly, the loading force on an end mill type cutting tool typically has a tangential component and a radial component. The radial component has little influence on the amount of horsepower required to drive the tool. The tangential component does, however. Therefore, when horsepower is sensed it primarily indicates only the tangential component. When an end mill wears, however, it is the radial component that changes and increases, and the tangential component remains relatively constant. Therefore, for this reason and other discussed in application Ser. No. 825,134 sensed changes in horsepower do not give a good indication of tool wear.

It is an object of the present invention to provide a system that can accurately indicate tool wear, and which can be easily implemented on most of the currently existing microprocessor controlled milling machine systems.

DISCLOSURE OF THE INVENTION

The present invention provides a system for indicating cutting tool wear or dullness that is particularly applicable to a rotating cutting tool such as an end mill.

A system in accordance with this invention can detect end mill wear as it occurs during milling. This is accomplished by first sensing the total or resultant side-loading force or forces acting on the tool. The resultant force has a radial component and a tangential component which are mathematically related to the resultant force by the following equation:

$$FRES = \sqrt{(FR)^2 + (FT)^2} \qquad \text{Eq. 1}$$

where FRES is the resultant force; FR is the radial force; and FT is the tangential force.

In addition to sensing the resultant force, the average torque driving the tool during milling is also sensed. An end mill has a cross-section generally as shown in FIG. 4 and its radius is known. Knowing the torque driving the end mill permits calculation of the resultant force's tangential component by merely dividing the value of the sensed torque by the tool's radius. Once the tangential force component is calculated, and since the resultant side-loading force is known from sensing it, the radial force component can be calculated algebraically from the above equation.

It is known that the radial force component increases with increased tool wear but the tangential component remains relatively constant. The above steps are performed continuously during milling and when the radial component exceeds a certain level or magnitude, then the tool is known to be dull. Preferably, a ratio of the radial component to the tangential componet is continuously calculated during milling and when this ratio exceeds a certain amount the tool is deemed dull.

Typically, an end mill is mounted to a spindle which is received within a spindle housing mounted to a milling machine. Preferably, resultant side-loading forces are continually sensed by means of strain gauges suitably mounted to the spindle housing. These sensors can detect compressive and tensile forces in the housing which indicate the total resultant side-loading force, but not its radial and tangential components. The tangential component is calculated from the torque driving the end mill which can be easily determined by measuring the electrical power required to drive the spindle motor. As per the above, knowing the resultant force and its tangential component permits calculation of the resultant component.

The invention as disclosed above will be more fully described and better understood when reading the following description of the best mode for carrying out the invention in conjunction with the accompanying drawings.

BEST MODE FOR CARRYING OUT THE INVENTION

I. INTRODUCTION

In the following description of the best mode for carrying out the invention, the contents of the subject matter disclosed in copending patent application Ser. No. 825,134, now U.S. Pat. No. 4,698,773, are incorporated herein by reference. The following description is directed specifically, but not in the limiting sense, to rotating cutting tools such as end mills, which are well-known in the art. Any mention of tool wear therefore, is directed to wear of an end mill.

Figure 5:
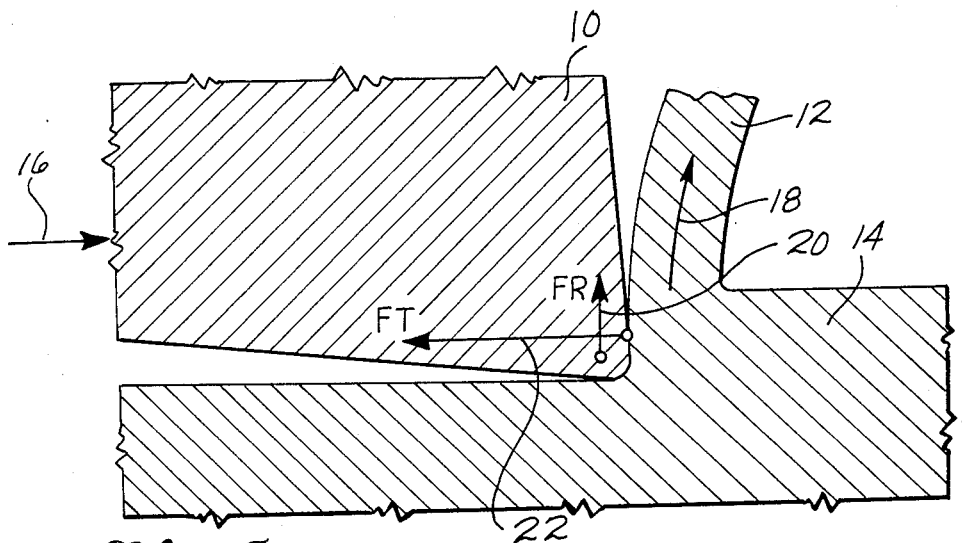
FIGS. 5, 6, 7, and 8 shows from different perspectives the various vector forces on the end mill cutter.

The final dimensions of a milled part or workpiece can be significantly affected by tool wear because the diameter of the tool gradually decreases as it wears. Another phenomenon which more substantially, albeit indirectly, affects final part dimensions is dynamic tool bending which occurs during milling, and which increases in correspondence with increased loading forces on the tool caused by wear. For example, and referring now to FIGS. 5 and 6, therein is shown a sharp cutting edge 10 of an end mill shearing a chip 12 from a part 14. The direction of motion of both the edge 10 and the chip 12 are indicated, respectively, by arrows 16 and 18. What has hereinbefore been mentioned as side-loading forces on a tool is actually the force acting on the edge 10 as it cuts. This force has a radial component FR indicated by vector 20, and a tangential component FT indicated by vector 22. Referring now to FIG. 7, there is schematically shown how the total or resultant side-loading force 24 is the sum of the radial 20 and tangential 22 components.

Figure 6:
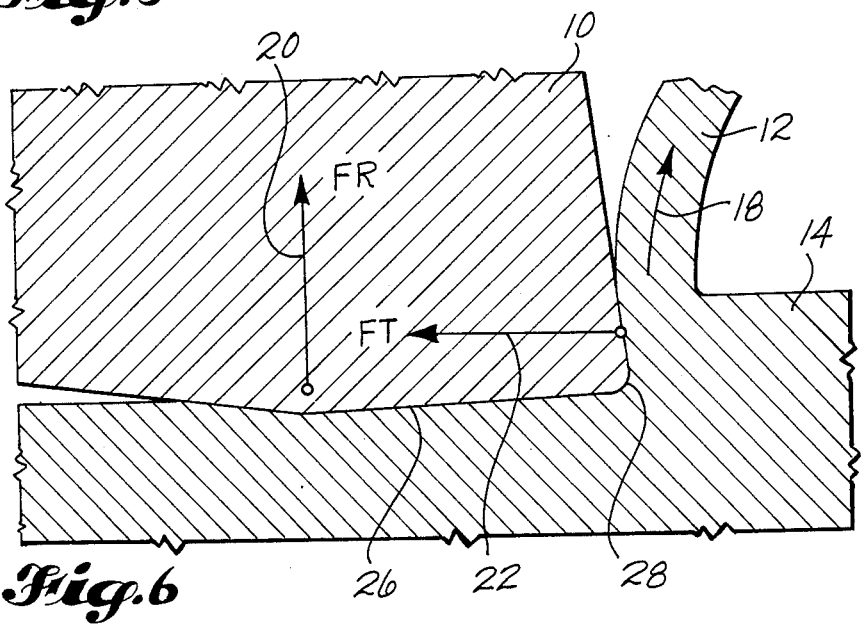
Figure 7:
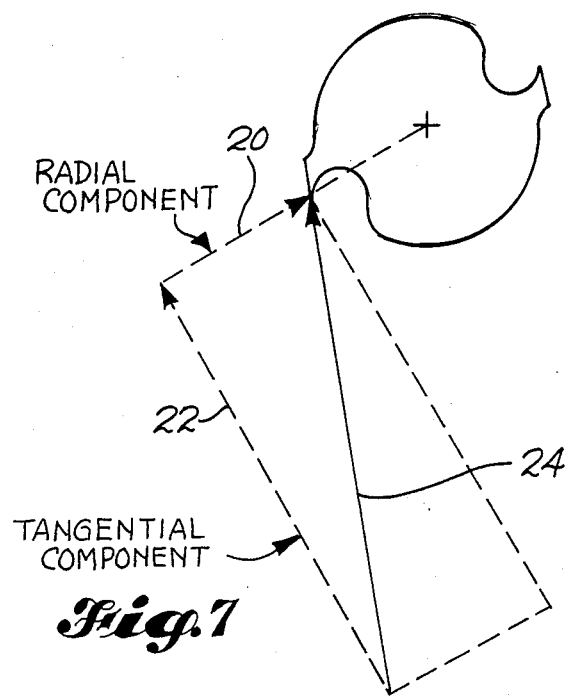

As the edge 10 wears or becomes dull a wear-land area 26 grows from the edge's tip 28 in the manner shown in FIG. 6. As this happens, the magnitude of the radial component 20 increases significantly but the tangential component 22 remains relatively constant. This has been proven by test results which are presented in FIG. 4.

Figure 4:
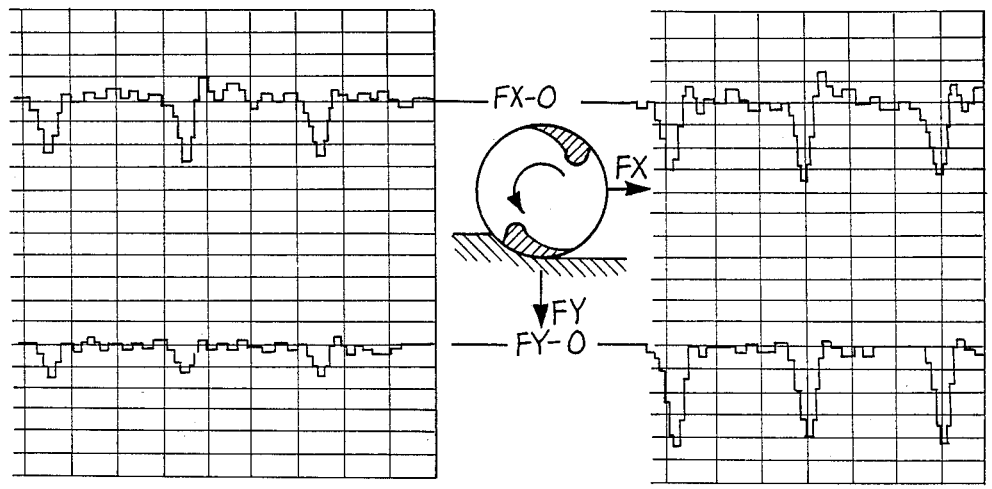
FIG. 4 shows a graph of the tangential and radial forces on the end mill cutter.
Figure 2:
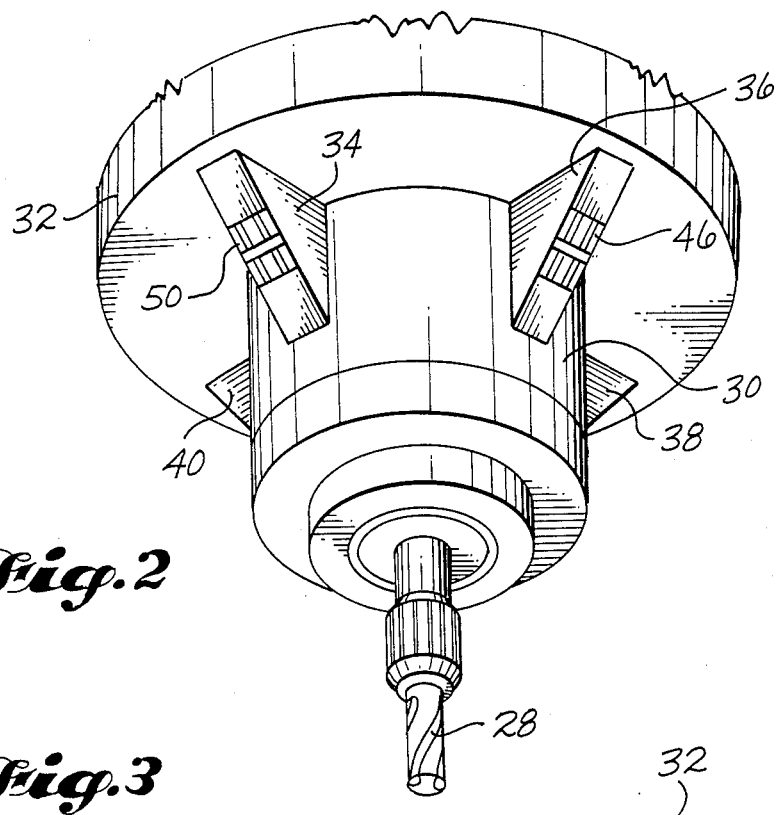
FIGS. 2 and 3 show top and front views of the end mill respectively.
Figure 3:
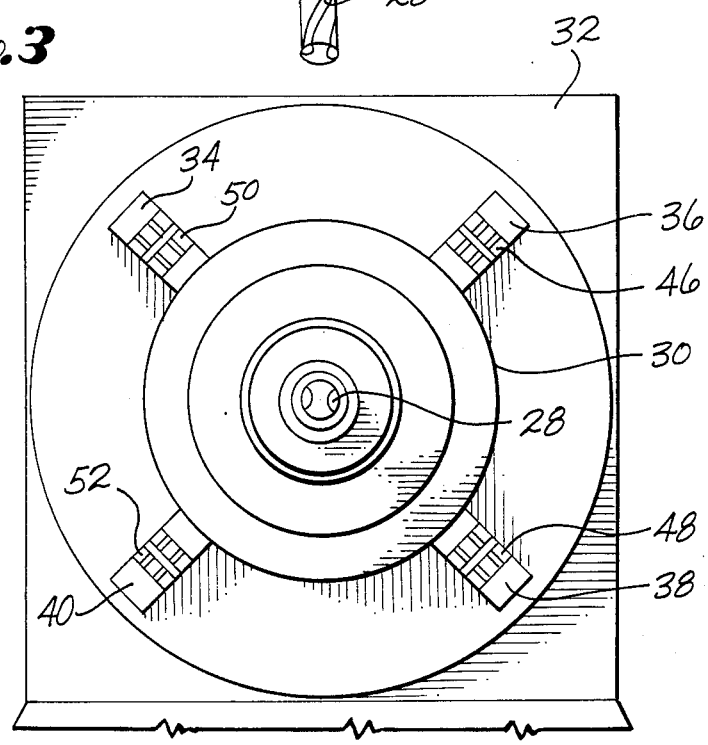

Referring now to FIG. 4 therein is shown actual measurements of loading forces acting on a particular end mill when the end mill is both sharp and dull. These measurements were taken in conjunction with an end mill having two cutting flutes and a diameter of two inches. The end mill was turning at a rate of 1000 rpm during the tests and had a feed rate of 60 inches per minute while cutting aluminum. The end mill was cutting at an axial depth of 0.5 inches and a radial depth of 0.05 inches. The measurements were made in a stationary coordinate system and therefore the force "FX" is not a true measurement of tangential force but only an indicator thereof. Similarly, the force FY only provides an indicator of the true measurement of the radial force. As can be seen by comparing the results on the left-hand side of FIG. 4, which indicates tangential and radial forces for a sharp end mill, with the results on the right-hand side, which indicates the same forces for a dull end mill, the tangential forces tend to remain relatively constant with perhaps a slight increase when the end mill becomes dull. However, the radial forces tend to increase significantly, perhaps as much as a factor of 3. The peak forces shown in FIG. 4 result from the fact that the end mill actually cuts during only a fractional period of each total revolution. The rest of the time the end mill is "air cutting."

The side-loading forces on a cutting tool act on the tool in a plane normal to the tool's axis of rotation. As discussed above, these side-loading forces can be thought of as having two components: a tangential component FT and a radial component FR which are normal to each other. The total or resultant side-loading force "FRES" caused by these components can be directly measured relatively easily. Additionally, the tangential component FT is relatively easy to directly measure. However, the radial component FR, whose value represents tool wear is difficult to measure directly.

Figure 1:
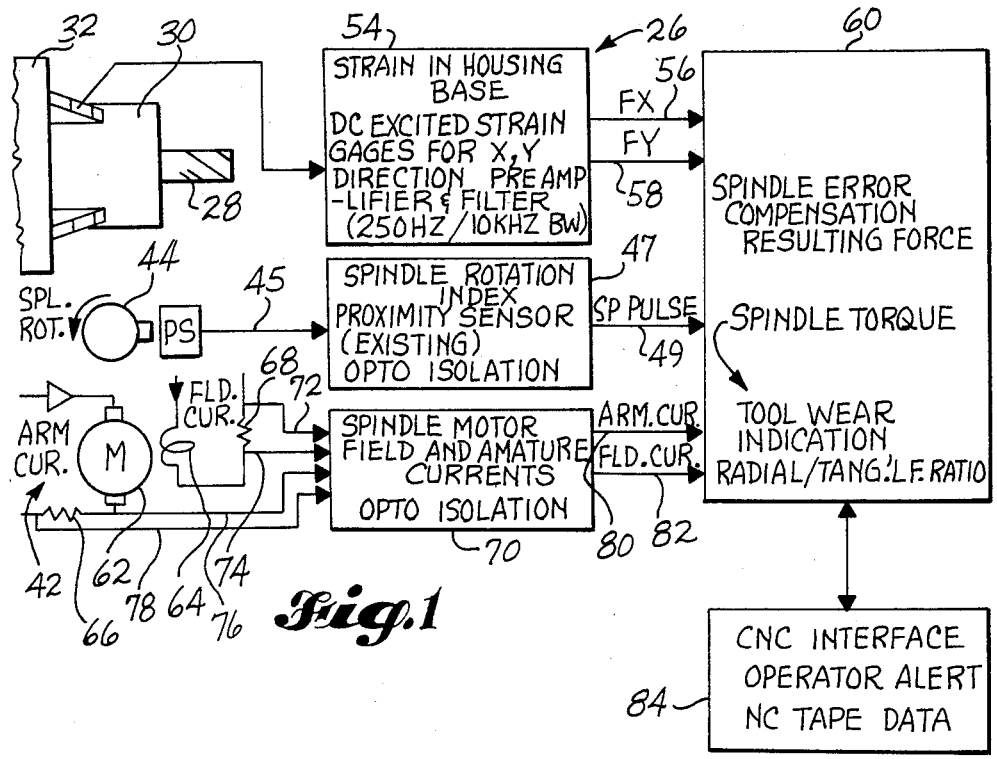
FIG. 1 shows a control schematic for an end milling machine.
Figure 8:
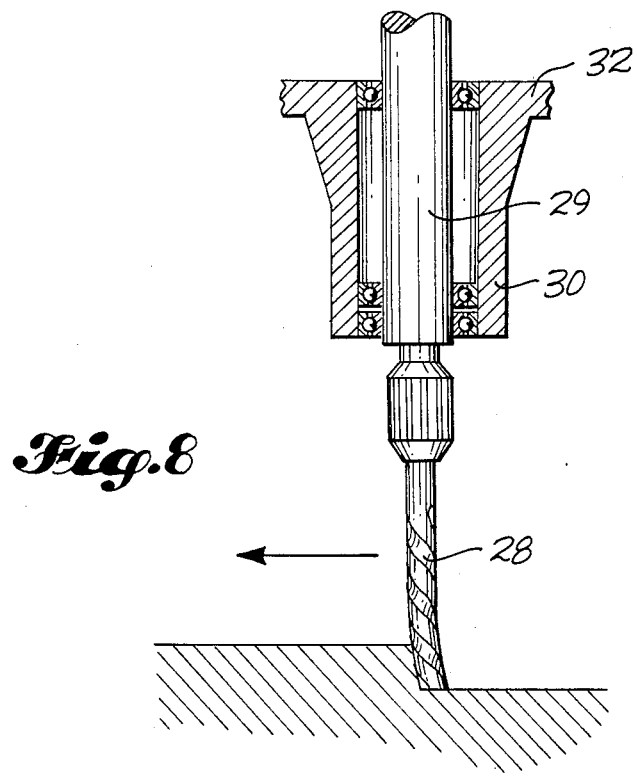

Referring now to FIG. 1, there is shown schematically at 26 a typical milling machine system, such as a Sundstrand OM-2 (trademark) milling machine. The system 26 includes an end mill 28 connected to a spindle 29 (see FIG. 8) which is received in a housing 30. The housing 30 has a base portion 32 connected to the milling machine and four buttresses 34, 36, 38, 40 interconnecting the base portion 32 and the housing 30. The spindle is driven in rotation by a motor which is schematically indicated at 42. Each rotation of the spindle is indicated by a spindle index pulse sensor schematically indicated at 44. The system 26 as thus described above would be familiar to a person skilled in the art and thus need not be described in further detail.

As the end mill 28 cuts a part, the side-loading forces acting on the mill cause compressive and tensile forces in the spindle housing 30. These forces can be sensed by suitable strain gauges 46, 48, 50, 52 connected to the buttresses 34, 36, 38, 40. The strain gauges 46, 48, 50, 52 output two force component signals, FX and FY, similar to those shown in FIG. 4. These signals are suitably filtered as indicated at 54 and transmitted as shown at 56, 58 for processing by a microprocessor 60.

The microprocessor 60 calculates the resultant side-loading force from the force components FX, FY. As mentioned above, these components are not the same as the radial component FR and the tangential component FT of the side-loading force since FX and FY are measured in a stationary coordinate sytem, and not a rotating one. However, the vector sum of FX and FY is equal to the resultant side-loading force FRES and since the resultant force is related to the radial and tangential forces by the Eq. (1) above, the radial force can be mathematically extracted therefrom if the tangential force component is known.

The tangential component FT is equal to the torque on the end mill 28 divided by the end mill's radius. This torque can be sensed by measuring the amounts of the armature 62 and field currents 64 of the spindle drive motor 42. The armature and field currents 62, 64 can be sensed as voltages across two resistors 66, 68, for example. These voltages are passed through analog opto-isolation circuitry 70 as shown at 72, 74, 76, 78, and transmitted onwardly as shown at 80, 82 for processing by the microprocessor. As a person skilled in the art would know, the analog opto-isolation circuitry 70 eliminates interference from noise which is typically generated in the high power level circuits of the spindle drive motor 42. The product of the two signals 80, 82 provides a good measure of the torque acting on the end mill 28.

The force signals FX, FY must be adjusted to compensate for spindle defects in the manner disclosed in copending application Ser. No. 825,134. Similarly, the signals indicating the levels of armature and field currents 80, 82 must also be adjusted to compensate for the extra torque, or tare torque, required by the spindle drive motor 42 to overcome friction in the motor 42 and any gear mechanisms connecting the motor to the spindle. This is a relatively constant value and can be obtained by running the motor 42 during a noncutting condition.

The microprocessor 60 is suitably programmed to calculate the resultant side-loading force FRES, and the radial and tangential components thereof from the signals received at 56, 58, 47, 80, and 82. The programming requirements for the microprocessor 60 are set forth below.

II. SYSTEM PROGRAMMING REQUIREMENTS

The microprocessor 60 may be any one of a wide variety of suitable microprocessors. The strain gauge signals 56, 58 should be processed approximately once every millisecond. This is necessary because the force acting on the end mill 28 is cyclical corresponding to the periods during each revolution when a cutting edge is either cutting material or air cutting. The relatively high frequency of processing or sampling is also necessary in order to compensate for fairly large cyclic fluctuations in the strain gauge signals 56, 58 which are caused by spindle defects, a phenomenon discussed in application Ser. No. 825,134. Preferably, therefore, if the end mill 28 is rotating at a rate of 1000 revolutions per minute, which is typical, the microprocessor 60 is programmed to process the signals 56, 58 from the strain gauges 46, 48, 50, 52 approximately 60 times per revolution.

The microprocessor 60 adjusts the strain gauge signals 56, 58 to compensate for spindle defects in the same manner disclosed in application Ser. No. 825,134. The spindle rotation indicator 44 provides a pulse as indicated at 45 for every revolution of the spindle. This pulse is processed by proximity sensor circuitry 47 which transmits a pulse signal to the microprocessor 60 as indicated at 49. The pulse signal is therefore used by the microprocessor 60 to determine spindle position for each revolution.

Torque on the spindle and end mill 28 changes much more slowly than the side-loading forces. For this reason, preferably the microprocessor 60 could be programmed to calculate end mill torque once every four to eight milliseconds.

The microprocessor 60 calculates the value for end mill torque which represents an average of the true torque on the end mill. The reason this is an average value is because of the large moments of inertia in the rotating members that make up the spindle drive system such as, for example, the spindle drive motor 42 and any gear mechanism connecting the motor to the spindle. The instantaneous torque on the end mill 28 in actuality pulsates widely as each cutter flute enters and leaves the part. To better understand this, if a cut is being made that has a shallow radial depth, then a flute will actually be cutting only during a small fraction of each revolution. During this time the torque is relatively high. However, during the rest of the time the tool is air cutting and the torque is zero.

Since the torque calculated by the microprocessor 60 is an average value, it is therefore a requirement that the resultant side loading force FRES also be calculated as an average value. The resultant force FRES is calculated from the strain gauge signals 56, 58, after such signals have been corrected for spindle defects, by the below equation:

$$FRES = \sqrt{FX^2 + FY^2} \qquad \text{Eq. 2}$$

where, as mentioned before, FX and FY are stationary components of the resultant force provided by the strain gages 46, 48, 50, 52.

FRES is calculated once per millisecond and is accumulated in memory for a period of eight spindle revolutions. At the end of this time the total accumulated FRES is divided by the number of samples taken during the eight revolutions (approximately $8 \times 60$ for the example referred to above) to get an average resultant side-loading force AVGRF. During the same eight revolutions, torque data is accumulated and the sum is then divided by the total number of samples taken during the same eight revolutions. After correction for the tare torque caused by spindle motor and gear mechanism frictional losses, which was previously described, the average torque AVGTRQ is yielded.

The tangential component FT of the resultant force is equal to the value of the average torque AVGTRQ divided by the radius of the end mill 28. Thus knowing FT, FR can be calculated from Eq. (1) by substituting AVGRF for FRES. Alternatively, the average resultant force AVGRF may be multiplied by the tool radius "R" and related to the quotient Q by the below equation:

$$Q = \frac{R * AVGRF}{AVGTRQ} \quad \text{Eq. 3}$$

The average value of FR/FT is calculated simply by taking the closest value from the table of the function:

$$\sqrt{Q^2 - 1} \quad \text{Eq. 4}$$

where this value may be scaled for an analog output through a digital analog channel from the microprocessor 60 if so desired.

The above described system requires only input data for the diameter of the end mill or tool from either an operator keyboard or from statements added to a preexisting numerical control program as indicated at 84 in FIG. 1. The microprocessor 60 could indicate tool wear when Eq. 4 achieves a certain value if so desired. The system described herein may be implemented independently or as part of a feed rate override system as described in copending application Ser. No. 825,134.

The description of the best mode for carrying out the invention as presented above is not meant to limit the scope of obtainable patent protection. Rather, the outer boundary of patent protection is to be limited by the subjoined claims which follow, wherein such claims are to be interpreted in accordance with statutory and judicially established doctrines of patent claim interpretation.

What is claimed is:

1. A method of determining wear of a rotating end mill having a generally circular cross-section defined by a radius, for use in connection with a milling machine having a spindle motor that rotatingly drives said end mill during a milling operation, the method comprising the following steps:
   (a) providing strain gauges operable to sense the value of a resultant side-loading force (FRES) acting on said end mill during said milling operation;
   (b) using said strain gauges to continually sense said resultant side-loading force (FRES), wherein said resultant force (FRES) has a radial force component (FR) and a tangential force component (FT) whose magnitudes are mathematically related to said resultant force (FRES) by the following equation:

$$FRES = \sqrt{(FR)^2 + (FT)^2}$$

(c) determining the value of the torque on said end mill by measuring the electrical power required to drive said spindle motor;
   (d) calculating the value of said tangential force component (FT) from the value of said torque determined in step (c), by dividing said torque value by the radius of said end mill;
   (e) calculating the value of said radial force component (FR) from said sensed value of said resultant force (FRES) and said calculated value of said tangential force component (FT) by using the mathematical relationship set forth in step (b); followed by
   (f) calculating the ratio of said radial force component (FR) to said tangential force component (FT); followed by
   (g) replacing said end mill when ratio calculated in step (f) exceeds a certain value.

2. The method of claim 1, including determining the average value of said resultant side-loading force (FRES) over a certain number of preselected revolutions of said end mill prior to step (e), and determining the average value of said torque over eight revolutions of said end mill prior to step (d).

3. The method of claim 1, wherein said milling machine includes a spindle to which said end mill is mounted, and a spindle housing in which said spindle is received, said spindle being driven in rotation by said spindle motor, and including
   sensing said value of said resultant side-loading force (FRES) by mounting said strain gauges to said spindle housing, for sensing compressive and tensile forces in said housing caused by said resultant side-loading force (FRES) acting on said end mill during milling.

4. The method of claim 3 including
   adjusting said value of said resultant side-loading force (FRES) to compensate for errors in the values of said sensed compressive and tensile forces caused by defects in said spindle as it is driven in rotation by said motor.

* * * * *

UNITED STATES PATENT AND TRADEMARK OFFICE
CERTIFICATE OF CORRECTION

PATENT NO. : 4,802,095
DATED : January 31, 1989
INVENTOR(S) : Jan Jeppsson

It is certified that error appears in the above-identified patent and that said Letters Patent are hereby corrected as shown below:

Column 2, line 9, "expanded" should be -- expended --.

Column 2, line 45, "other" should be -- others --.

Column 2, line 46, "825,134" should be -- 825,134, --.

Column 4, line 62, "there" should be -- therein --.

Column 5, line 9, before "mill", insert -- end --.

Claim 1, col. 7, line 47, delete "value of a".

Claim 1, col. 8, line 26, after "when", insert -- said --.

Signed and Sealed this

Nineteenth Day of December, 1989

Attest:

JEFFREY M. SAMUELS

*Attesting Officer*    *Acting Commissioner of Patents and Trademarks*